April 28, 1964   W. S. SCHAEFFER   3,130,644
FLUID TRANSMISSION
Filed March 16, 1962   2 Sheets-Sheet 1
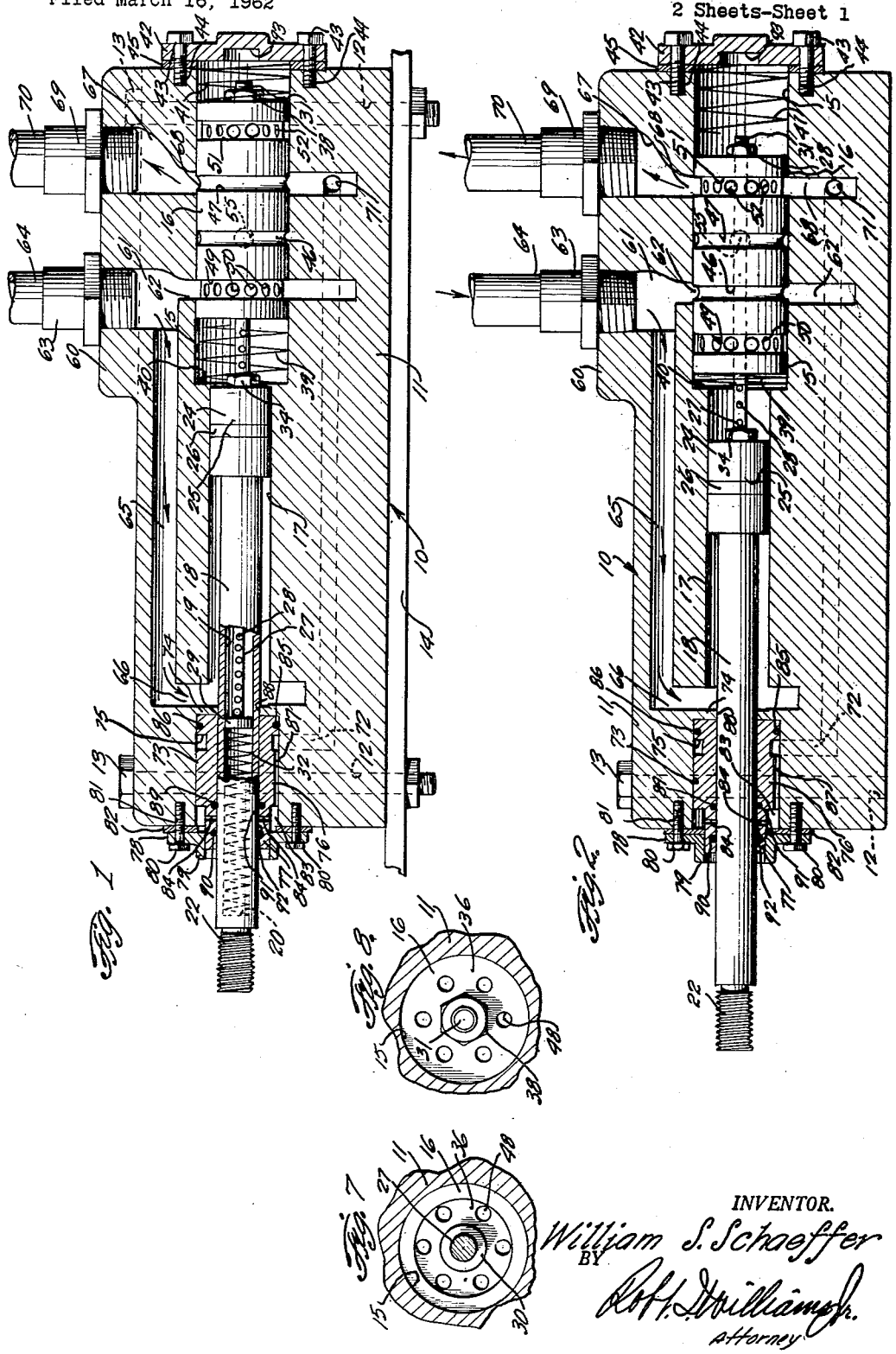
INVENTOR.
William S. Schaeffer
BY
Robt. T. Williams Jr.
Attorney

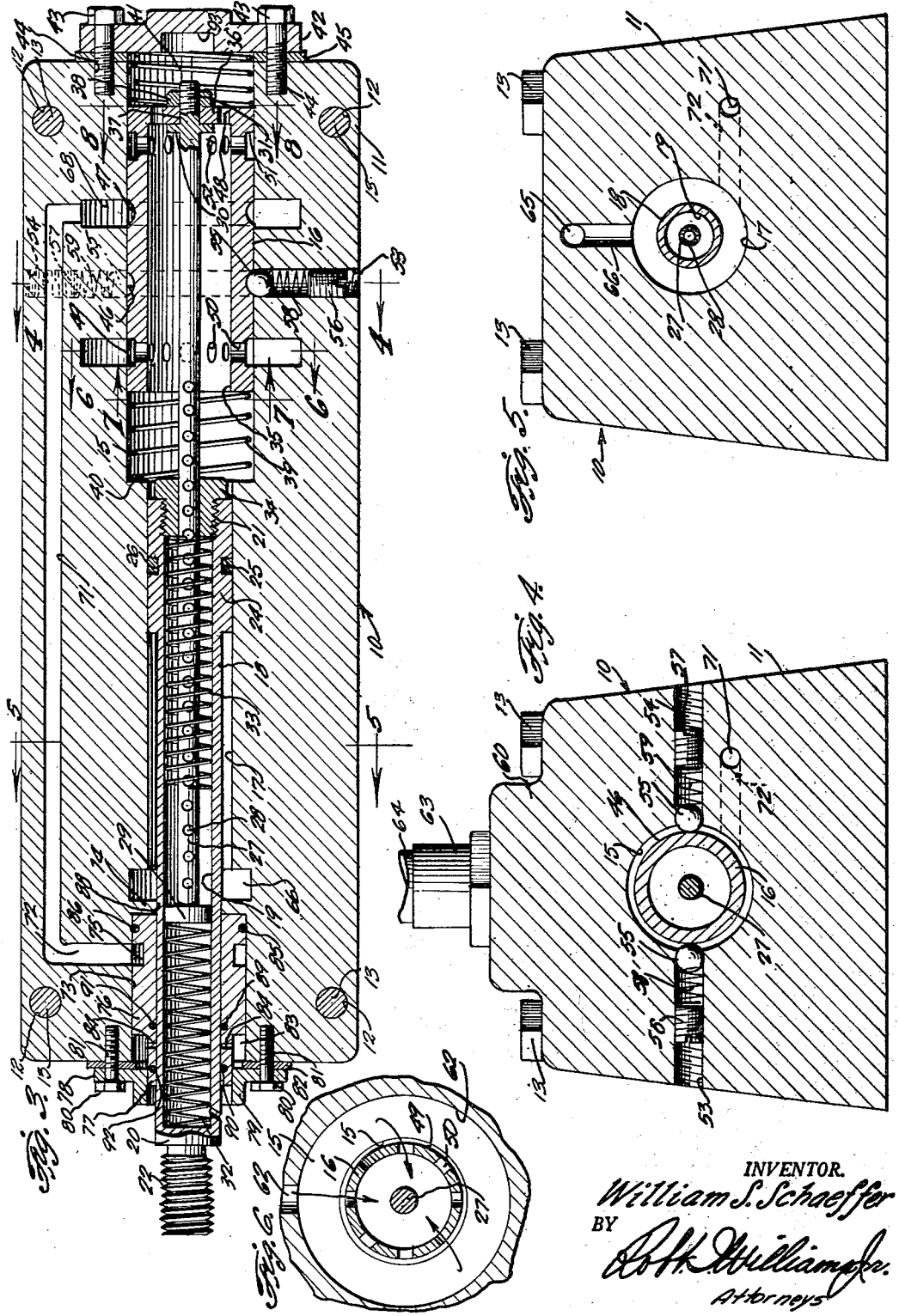

United States Patent Office 3,130,644
Patented Apr. 28, 1964

3,130,644
FLUID TRANSMISSION
William Sherman Schaeffer, South Webster, Ohio
Filed Mar. 16, 1962, Ser. No. 180,085
2 Claims. (Cl. 91—321)

This invention relates to improvements in fluid transmissions and more particularly to a fluid transmission for actuating the reciprocating cutter bar of a mowing bar assembly.

An object of this invention is to provide a hydraulically operated reciprocating piston assembly that develops its power thrust in a straight line coincident with its longitudinal axis.

Another object of the invention is to provide a fluid transmission for reciprocating the cutter bar of a tractor mowing machine, wherein the power thrust of the fluid transmission is in a direct line with the longitudinal axis of the cutter bar.

The fluid transmission of the present invention will eliminate the mechanical power train which includes belts, pulleys, shafts, gears, chains, pitmans, cranks and other conventional parts that are used at the present time in a tractor mowing machine, whereby the cutter bar is connected to the tractor, power-take-off to reciprocate the cutter bar of a tractor mowing machine. The elimination of such parts being accomplished by directly connecting the reciprocating piston with the cutter bar of the mowing machine so that a straight line drive or push and pull effect is provided between the piston and the cutter bar.

In tractor mowing machines the cutter bar is reciprocated at relatively high speeds and the mowing machine must be adequately constructed to accommodate the high degree of vibration that accompanies such high speed operation. The present invention has been designed, therefore, to eliminate the many disadvantages that accompany the large degree of flexibility that must be present in tractor mowing machines, wherein such flexibility is achieved by universal joints, telescopic shafting and the other parts previously mentioned. The use of the hydraulic transmission also provide the hydraulic cushioning of the parts, thus producing more efficient and longer lasting tractor mowing machines.

With the above and other objects and advantages in view, the invention consists of the novel details of construction, arrangement and combination of elements more fully hereinafter described, claimed and illustrated in the accompanying drawings, in which:

FIG. 1 is a vertical longitudinal sectional view, partly in elevation, of a fluid transmission embodying the invention, with the piston in full rear position;

FIG. 2 is a view similar to FIG. 1, with the piston in full forward position;

FIG. 3 is a transverse longitudinal sectional view;

FIG. 4 is a transverse sectional view on the line 4—4 of FIG. 3;

FIG. 5 is a transverse sectional view on the line 5—5 of FIG. 3;

FIG. 6 is a transverse sectional view on the line 6—6 of FIG. 3;

FIG. 7 is a transverse sectional view on the line 7—7 of FIG. 3; and

FIG. 8 is a transverse view on the line 8—8 of FIG. 3.

Referring more in detail to the drawings, whereby like parts are designated by like reference numerals, the reference numeral 10 is used to designate a fluid transmission embodying the invention.

The fluid transmission 10 comprises an elongated quadrangular shaped body portion 11 that is provided at each corner thereof with a bolt receiving aperture 12 in which is positioned a large headed bolt and nut assembly 13, whereby the body portion 11 may be secured to plate 14 of a tractor mowing machine, not shown.

Positioned at one end of the body portion 11 and extending along the longitudinal axis thereof is a circular valve chamber 15 in which is positioned a valve 16. Also extending along the longitudinal axis of the body portion 11 and in communication with one end of the chamber 15, is a circular piston rod receiving bore 17 through which extends a piston rod 18. The piston rod 18 is of chrome steel, having a longitudinally extending bore 19, a closed end 20 and an internally threaded open end 21. The closed end 20 has an externally threaded stud or connector 22 which is adapted to have connected thereto a coupling which in turn is connected to a cutter bar, not shown, of a tractor mowing machine. The piston rod 18 adjacent the open end 21 is provided with an integral piston portion 24 and in the outer periphery thereof there is a centrally located annular groove 25 in which is positioned a piston ring 26.

Extending longitudinally of the bore 19 in the piston rod 18, is a hollow valve rod 27, which is provided with a plurality of equally spaced apertures 28, which permits the fluid in the fluid transmission 10 to flow more freely within the piston rod 18 and thus prevents sloshing of the fluid and removes strain on the other elements of the fluid transmission. One end of the valve rod 27 is provided with a piston head 29 and the other end is externally threaded at 31 and provided with an annular collar 30 inwardly thereof. A first coiled valve spring 32 is positioned in the bore 19 in the valve rod 27 in circumjacent relation thereto intermediate of the closed end 20 and the piston head 29. A second coiled valve spring 33 is positioned in the bore 19 on the rod 27 in circumjacent relation thereto intermediate of the piston head 29 and a centrally apertured threaded cap nut 34 that is engaged with the internally threaded open end 21 of the piston rod 18. The valve springs 32 and 33 are of the compression type and the piston head 29 engages the springs 32 and 33 to permit expansion and contraction thereof, thereby assisting in reciprocating the valve 16.

The valve 16 is hollow having an open end 35 and a closed end 36. The valve rod 27 extends through the cap nut 34 and valve 16 so that the threaded end 31 thereof projects outwardly of the closed end 36 of the valve 16 through a centrally located aperture 37. A nut 38 is threaded on the threaded end 31 until the collar 30 on the valve rod 27 is drawn into abutting relation with the inner surface of the closed end 36 of the valve 16.

A first coiled shock spring 39 is positioned in the chamber 15 in circumjacent relation to the valve rod 27 and intermediate of the open end 35 of the valve 16 and a shoulder 40 that is formed at the communicating end of the bore 17. The spring 39 is of a size that is coincident with the size of the valve 16 so that it will not enter the end 35 of the valve 16. A second coiled shock spring 41 is positioned in the chamber 15 intermediate of the closed end of the valve 16 and a closure plate 42 for the chamber 15 that is secured to the body portion 11 by bolts 43 that extend into threaded sockets 44 in the end of the body portion 11. The springs 39 and 41 prevent shock to the valve 16 in its forward motion and also prevents overtravel of the valve 16. A sealing gasket 45 is positioned intermediate of the closure plate 42 and the end of the body portion 11 to provide a leak proof joint between the closure plate 42 and the end of the body portion 11. The closed end 36 of the valve 16 is provided with a circular row of apertures 48 that are in equally spaced relation to each other and in circumjacent spaced relation to the centrally located aperture 37. The closure plate 42 is provided with a centrally located circular cavity 93 which provide clearance for the end 31 of the valve rod 27 so that the end 31 will not strike the closure plate 42.

The valve 16 is provided with a forward annular pawl receiving groove 46 and a rearward annular pawl receiving groove 47. Adjacent the open end 35 of the valve 16 forwardly of the groove 46, there is provided a first annular groove 49 in which are positioned a plurality of equally spaced pressure ports 50 and intermediate of the groove 47 and the closed end 36 of the valve 16 is a second annular groove 51 in which are positioned a plurality of equally spaced discharge ports 52.

Diametrically opposed bores 53 and 54 extend transversely of the body portion 11 in alinement with each other and spring pressed pawls 55 positioned in the bores 53 and 54 on opposite sides of the valve 16, are adapted to be received in the annular grooves 46 and 47, as will be later described. The bores 53 and 54 are partially threaded to receive threaded adjusting plugs 56 and 57 which bear upon the springs 58 and 59, respectively, and urge the pawls 55 into the grooves 46 and 47. The springs 32 and 33 conform in tension to the springs 58 and 59 and the compression of the springs 32 and 33 are governed by the movement of the valve rod 27 until the compression thereof causes the springs 32 and 33 to function as a solid member and thus resist the further movement of the piston rod 18.

An elongated rectangular raised portion 60 is formed integrally with the upper surface of the body portion 11. The portion 60 is provided with a pressure or inlet port 61 which by a circular throat 62, FIG. 6, is in communication with the groove 49, FIG. 1, and a coupling 63 connected into the inlet port 61 is connected to an inlet pressure supply line 64. A passageway 65 extends longitudinally of the body portion 11 in parallel relation to the bore 17 and by means of a right angularly disposed annular passageway 66 has communication with the bore 17 at the forward end thereof. The throat 62 and passageway 66 allows fluid under pressure within the hydraulic transmission 10 to completely surround the piston rod 18 and valve 16 to provide hydraulic balancing of the moving parts. A discharge or outlet port 67 is also provided in the portion 60 which by means of a circular throat 68 may be placed in communication with the groove 51, FIG. 2, and a coupling 69 connected into the outlet port 67 is connected to an outlet or discharge line 70. A drain passageway 71 extends longitudinally of the body portion 11 in parallel relation to the bore 17 and by means of a right angularly disposed passageway 72, has communication with a bore 73 that is positioned in the body portion 11 outwardly of the end of the bore 17. The forward end of the bore 17 is separated from the rear end of the bore 73 by an inner wall 74 and the wall 74 has a central opening 88 therein to receive the piston rod 18. The bore 73 has a bushing 76 pressfit therein, and the bushing 76 has an annular groove 75 in the outer surface thereof that communicates with the forward end of the passageway 72.

The bushing 76 supports the piston rod 18 and has a circular neck portion 77 thereon that extends outwardly of the bore 73 in the body portion 11. An end cap 78 having an outer bushing 79 integral therewith, is secured by bolts 80 to the forward end of the body portion 11 by means of threaded sockets 81. A gasket 82 positioned between the cap 78 and the end of the body portion 11 provides a leak proof joint at that end of the body portion 11. The neck portion 77 of the bushing 76 provides an annular drain groove 83 and apertures 84 in the forward end of the piston rod 18 communicate with the groove 83. Communication between the grooves 75 and 83 being achieved through the medium of a longitudinally extending slot 87 in the bushing 76, FIG. 1. The bushing 76 is also provided at the inner end thereof with an annular groove 85 in which is positioned an O seal ring 86, and the outer end of the bushing 76 has O seal rings 89 and 90, respectively, positioned in annular grooves 91 and 92, respectively.

In the operation of the fluid transmission 10, the inlet pressure supply line 64 and the outlet or discharge line 70 are connected to the hydraulic fluid operating system of a tractor mowing machine, not shown.

With the fluid being under pressure at all times on the forward end of the piston 24, the fluid in the hydraulic transmission is compounded. Thus, when the valve 16 is moved to the position in FIG. 2 so that the ports 52 in the groove 51 are in communication with the throat 68 of the outlet port 67, the fluid pressure on the front of the piston 24 will force the fluid out of the outlet port 67 until the fluid pressure has moved the valve 16 to the position shown in FIG. 1. In the position of FIG. 2, the piston head 29 on the valve rod 27 has compressed the first coiled spring 32, the pawls 55 are in the groove 47 and the first shock spring 39 is also under compression. The valve 16 is now ready for the next stroke wherein it moves to the position of FIG. 1. The valve 16 moves into engagement with the second coiled shock spring 41 and the pawls 55 are moved out of groove 47 into groove 46. The ports 50 in the groove 49 are in communication with the throat 62 of the inlet port 61 and the fluid is flowing around the valve 16 and entering through the ports 50 into the valve 16 to be impinged upon the inner end of the piston 24. The throat 68 of the outlet port 67 is closed and no oil can flow through the throat 68 with the valve 16 in this position.

A careful comparison of FIGS. 1 and 2 will disclose that the grooves 49 and 51 and the grooves 46 and 47 are so spaced that at no time will there be simultaneous communication of the ports 50 and 52 in the grooves 49 and 51 with their respective throats 62 and 68.

The piston 24 is now at its extreme rearward position, the spring 32 is in fully expanded position, the shock spring 41 is now under full compression and the valve 16 is now ready to return to the position of FIG. 2. With the fluid under pressure flowing through the valve 16 and impinging against the piston 24, the piston is forced forward, forcing the fluid in front of it into passageways 66 and 65 and the valve 16 in the position of FIG. 2 permits the fluid to flow into the throat 68. The valve 16 has thus been forced to move into the position of FIG. 1. The fluid forced outwardly of the bore 17 is flowing through the inside of the valve 16 outwardly through the ports 52 into the throat 68. The fluid is now at the rear of the piston 24 and the same amount of fluid that was at the front of the piston is at the rear thereof and the fluid is thus compounded.

During the reciprocation of the valve 16, the movement thereof is at the same speed in both directions for the forward face of the piston 24 displaces only one half of the cubic inch displacement that is present at the rear face thereof. Thus, regardless of the size of the fluid transmission, the same ratio of displacement will prevail. The grooves 49 and 51 permit fluid to flow around the grooves at all times to hydraulically balance the valve 16.

The pawls 55 are positioned at the center of the valve chamber 15 and with a pawl on each side of the valve 16, the pressure on the valve is balanced. The fluid will flow to the rear of each pawl to eliminate the surge of the fluid as the pawls 55 are moving from one groove to another.

During the movement of the valve 16, any fluid that accumulates in the forward end of the fluid transmission will drain into the passageway 71 from the grooves 83, apertures 84, slot 87 and passageway 72 until the fluid is compounded as previously described.

The valve 16 must travel at the same speed in both directions, for if this is not accomplished the cutter bar connected to the piston rod will not reciprocate properly in a smooth jerkless motion. With the piston rod and valve connected together by the floating valve rod, the springs at the opposite sides of the piston head 29 will assist in operating the valve 16 and the shock springs 39 and 41 will compensate for any over thrust of the valve 16. The apertures 48 in the closed end 36 of the valve 16 prevent sloshing of the fluid and aids in balancing the fluid.

The O rings prevent leakage of the fluid outwardly of the body portion 11 and unrestricted movement of the fluid, as desired, to permit efficient smooth operation of the fluid transmission is adequately provided in the manner in which the fluid is moved from the front to the rear of the piston and the fact that any surplus fluid is drained back to the outlet of the fluid transmission.

There has thus been provided a highly efficient fluid transmission that will efficiently reciprocate the cutter bar of a tractor mowing machine and it is believed that from the foregoing description the structure and operation thereof will be clear to those skilled in the art. It is also to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

1. A compounded hydraulic transmission comprising a closed fluid circuit in which the fluid is under pressure in one direction, a body member having inlet and discharge ports and a reciprocating piston therein, a hollow piston rod integral with said piston, a floating valve rod having a plurality of slosh-preventing apertures therein and a piston thereon extending through said piston and piston rod, a valve connected to said valve rod, an annular row of ports in said valve at each end thereof for communication with said inlet and discharge ports, pressure responsive springs positioned in said body fore and aft of the piston head on said valve rod and compression springs positioned in said body fore and aft of said valve, said springs aiding and giving impetus to said piston and for assisting the reciprocation of said valve, annular passageways in said body that are alternately in communication with said valve during the reciprocation of said valve, longitudinally-extending passageways in said body and said passageways are in communication with the ports in said valve, and positioning means in said body intermediate of said ports for engagement with said valve to retain the ports in said valve in communication with their respective inlet and discharge ports.

2. A hydraulic transmission comprising a body portion, inlet and discharge openings in said body, means for connecting said openings to an operating pressure fluid supply, a floating piston and a floating valve in said body, said valve having a pair of annular rows of equally-spaced ports therein and said ports are adapted to alternately communicate with said inlet and discharge openings, a hollow floating valve rod having a plurality of slosh preventing apertures therein and a piston head thereon for connecting said piston to said valve, means for directing fluid fore and aft of said valve, spring means positioned fore and aft of said piston head and fore and aft of said valve for assisting said valve for the reciprocating and controlling thereof, said valve having a pair of annular equally-spaced pawl receiving grooves therein intermediate of said annular rows of ports and spring-biased pawls mounted in said body for engagement with the annular grooves in said valve for retaining said valve in position whereby said ports are retained in positions of communication, and said body is provided with passageways for conducting the fluid to and away from said piston and said valve.

References Cited in the file of this patent

UNITED STATES PATENTS

| | | |
|---|---|---|
| 882,025 | Spoelstra | Mar. 17, 1908 |
| 1,094,811 | Reagan et al. | Apr. 28, 1914 |
| 1,488,171 | Sairdge | Mar. 25, 1924 |
| 2,028,938 | Logette et al. | Jan. 28, 1936 |
| 2,448,459 | Palm | Aug. 31, 1948 |
| 2,758,569 | Peterson | Aug. 14, 1956 |
| 2,804,055 | Hill et al. | Aug. 27, 1957 |
| 2,917,026 | Hall et al. | Dec. 15, 1959 |
| 2,980,080 | Joelson | Apr. 18, 1961 |

OTHER REFERENCES

German printed application 1,117,945, Nov. 23, 1961, (1 sht. dwg., 3 pages spec.)